(12) United States Patent
Segsworth et al.

(10) Patent No.: US 10,133,017 B2
(45) Date of Patent: Nov. 20, 2018

(54) VENTED OPTICAL TUBE

(71) Applicant: PGS Geophysical AS, Oslo (NO)

(72) Inventors: Matthew Segsworth, Austin, TX (US); Jeremy Smith, Austin, TX (US); Robert Alexis Peregrin Fernihough, Austin, TX (US); Jeff Bowlus, Austin, TX (US)

(73) Assignee: PGS Geophysical AS, Oslo (NO)

( * ) Notice: Subject to any disclaimer, the term of this patent is extended or adjusted under 35 U.S.C. 154(b) by 206 days.

(21) Appl. No.: 15/169,131

(22) Filed: May 31, 2016

(65) Prior Publication Data

US 2017/0038545 A1     Feb. 9, 2017

Related U.S. Application Data

(60) Provisional application No. 62/202,198, filed on Aug. 7, 2015.

(51) Int. Cl.
*G02B 6/44*     (2006.01)
*G02B 6/50*     (2006.01)
(Continued)

(52) U.S. Cl.
CPC .............. *G02B 6/4427* (2013.01); *B32B 1/08* (2013.01); *B32B 3/266* (2013.01); *G01V 1/226* (2013.01); *G02B 6/443* (2013.01); *G02B 6/4413* (2013.01); *G02B 6/4434* (2013.01); *B32B 2311/30* (2013.01); *B32B 2323/10* (2013.01); *B32B 2327/12* (2013.01); *B32B 2597/00* (2013.01); *E21B 47/0001* (2013.01); *E21B 47/102* (2013.01); *G01V 1/201* (2013.01); *G01V 1/3843* (2013.01); *G01V 1/52* (2013.01); *G02B 6/2558* (2013.01); *G02B 6/4429* (2013.01);
(Continued)

(58) Field of Classification Search
None
See application file for complete search history.

(56) References Cited

U.S. PATENT DOCUMENTS 3,659,256 A * 4/1972 Hudson ................. G01V 1/201
                                                  367/18
3,660,809 A * 5/1972 Pearson ................. G01V 1/201
                                                 367/152

(Continued)

FOREIGN PATENT DOCUMENTS

EP          0060180 A1 * 9/1982 ........... G02B 6/4413
GB          2021282 A * 11/1979 ........... G02B 6/4407
(Continued)

OTHER PUBLICATIONS

Machine Translation of JP 08234067 A, Sep. 1996 (Year: 1996).*
(Continued)

*Primary Examiner* — Jeffrey A Vonch

(57) ABSTRACT

Vented optical tube. At least some illustrative embodiments are conduits comprising a tube having a wall defining an interior volume of the tube. One or more optical fibers are disposed within the interior volume. The wall includes a plurality of vents passing from an outer surface of the wall to the interior volume, the plurality of vents disposed along a length of the tube, and wherein the vents are configured to convey a fluid in contact with the outer surface into the interior volume of the tube.

19 Claims, 5 Drawing Sheets

(51) Int. Cl.
  *G01V 1/22* (2006.01)
  *H04B 10/80* (2013.01)
  *B32B 1/08* (2006.01)
  *B32B 3/24* (2006.01)
  *B32B 3/26* (2006.01)
  *G01V 1/52* (2006.01)
  *G01V 1/38* (2006.01)
  *E21B 47/10* (2012.01)
  *G01V 1/20* (2006.01)
  *E21B 47/00* (2012.01)
  *G02B 6/255* (2006.01)

(52) U.S. Cl.
  CPC .......... *G02B 6/506* (2013.01); *H04B 10/801* (2013.01); *Y10T 428/139* (2015.01); *Y10T 428/1352* (2015.01); *Y10T 428/1355* (2015.01); *Y10T 428/1393* (2015.01); *Y10T 428/1397* (2015.01); *Y10T 428/24273* (2015.01); *Y10T 428/24322* (2015.01)

(56) References Cited

U.S. PATENT DOCUMENTS

| | | | | |
|---|---|---|---|---|
| 4,230,395 A * | 10/1980 | Dean | G02B 6/4413 | 385/101 |
| 4,300,218 A * | 11/1981 | Kruka | G01V 1/201 | 310/339 |
| 4,341,440 A * | 7/1982 | Trezeguet | G02B 6/4416 | 174/109 |
| 4,488,040 A * | 12/1984 | Rowe | G08B 13/126 | 250/227.14 |
| 4,631,711 A * | 12/1986 | Fowler | G01V 1/20 | 181/112 |
| 4,767,173 A * | 8/1988 | Priaroggia | G02B 6/4427 | 174/70 S |
| 4,821,241 A * | 4/1989 | Berglund | G01V 1/201 | 174/101.5 |
| 4,822,133 A * | 4/1989 | Peacock | G02B 6/4422 | 385/112 |
| 5,136,549 A * | 8/1992 | Berglund | B06B 1/0666 | 181/112 |
| 5,230,034 A * | 7/1993 | Bottoms, Jr. | G02B 6/4419 | 385/100 |
| 5,247,490 A * | 9/1993 | Goepel | H04R 23/008 | 356/478 |
| 5,325,457 A * | 6/1994 | Bottoms, Jr. | G02B 6/4419 | 385/100 |
| 6,016,702 A * | 1/2000 | Maron | G01L 9/0039 | 250/227.14 |
| 6,128,251 A * | 10/2000 | Erath | G01V 1/201 | 174/101.5 |
| 6,160,762 A * | 12/2000 | Luscombe | G01H 9/004 | 367/149 |
| 6,211,964 B1 * | 4/2001 | Luscombe | G01H 9/004 | 250/227.27 |
| 6,292,611 B1 * | 9/2001 | Chamberlain | G02B 6/4411 | 385/109 |
| 6,317,540 B1 * | 11/2001 | Foulger | G02B 6/4469 | 324/555 |
| 6,472,614 B1 * | 10/2002 | Dupont | H01B 7/0072 | 138/110 |
| 6,570,821 B1 * | 5/2003 | Moresco | G01V 1/201 | 174/101.5 |
| 6,744,954 B1 * | 6/2004 | Tanaka | G02B 6/4427 | 385/113 |
| 6,922,511 B2 * | 7/2005 | Rhoney | G02B 6/4411 | 385/101 |
| 7,006,740 B1 * | 2/2006 | Parris | G02B 6/441 | 385/109 |
| 7,024,081 B2 * | 4/2006 | Dowd | G02B 6/4492 | 166/351 |
| 7,266,273 B2 * | 9/2007 | Bonicel | G02B 6/449 | 385/100 |
| 7,422,378 B2 | 9/2008 | Lu et al. | | |
| 7,590,321 B2 | 9/2009 | Lu et al. | | |
| 8,620,124 B1 * | 12/2013 | Blazer | G02B 6/4489 | 385/102 |
| 8,915,659 B2 | 12/2014 | Marcouiller et al. | | |
| 2002/0071113 A1 * | 6/2002 | Moran | G01M 3/047 | 356/128 |
| 2002/0102086 A1 * | 8/2002 | Fewkes | C03C 25/106 | 385/128 |
| 2002/0119271 A1 * | 8/2002 | Quigley | B29C 70/086 | 428/36.9 |
| 2002/0136511 A1 * | 9/2002 | Cecchi | G02B 6/441 | 385/109 |
| 2002/0150360 A1 * | 10/2002 | Militaru | G02B 6/441 | 385/111 |
| 2003/0059183 A1 * | 3/2003 | Militaru | G02B 6/441 | 385/112 |
| 2003/0198133 A1 * | 10/2003 | Spackman | G01V 1/16 | 367/149 |
| 2004/0184352 A1 * | 9/2004 | Woo | H04R 1/44 | 367/149 |
| 2004/0190842 A1 * | 9/2004 | Rhoney | G02B 6/4411 | 385/106 |
| 2004/0258373 A1 * | 12/2004 | Andreassen | G01D 5/35303 | 385/100 |
| 2004/0258374 A1 * | 12/2004 | Karlsen | F16L 9/20 | 385/100 |
| 2004/0264831 A1 * | 12/2004 | Leppert | G01M 3/38 | 385/12 |
| 2005/0122838 A1 * | 6/2005 | Maas | G01V 1/22 | 367/20 |
| 2006/0072886 A1 * | 4/2006 | Kim | G02B 6/441 | 385/115 |
| 2006/0193572 A1 * | 8/2006 | Mjelstad | G02B 6/4427 | 385/101 |
| 2006/0227656 A1 * | 10/2006 | Berg | G01V 1/201 | 367/15 |
| 2007/0258319 A1 * | 11/2007 | Ronnekleiv | G01D 5/35383 | 367/20 |
| 2007/0258321 A1 * | 11/2007 | Tenghamn | G01V 1/201 | 367/20 |
| 2007/0258330 A1 * | 11/2007 | Berg | G01V 1/16 | 367/149 |
| 2008/0013898 A1 | 1/2008 | Wells | | |
| 2008/0066960 A1 * | 3/2008 | Mathiszik | E21B 47/01 | 175/41 |
| 2008/0074946 A1 * | 3/2008 | Hillesund | G01V 1/201 | 367/15 |
| 2008/0193091 A1 | 8/2008 | Herbst | | |
| 2009/0034903 A1 * | 2/2009 | Herbst | G01L 1/242 | 385/13 |
| 2009/0034917 A1 | 2/2009 | Burwell et al. | | |
| 2010/0044068 A1 * | 2/2010 | Deighton | H01B 7/0072 | 174/107 |
| 2010/0166370 A1 | 7/2010 | Cody et al. | | |
| 2010/0166375 A1 * | 7/2010 | Parris | G02B 6/4494 | 385/113 |
| 2010/0313659 A1 * | 12/2010 | Berg | G01P 15/093 | 73/514.26 |
| 2011/0044129 A1 * | 2/2011 | Traetten | G01V 1/201 | 367/20 |
| 2011/0058778 A1 * | 3/2011 | Herbst | G01M 5/0091 | 385/100 |
| 2011/0096624 A1 * | 4/2011 | Varadarajan | G01V 1/16 | 367/20 |
| 2011/0229071 A1 * | 9/2011 | Vincelette | E21B 43/2406 | 385/13 |
| 2011/0311179 A1 * | 12/2011 | Greenaway | E21B 47/123 | 385/12 |
| 2012/0111104 A1 * | 5/2012 | Taverner | G01H 9/004 | 73/152.16 |

(56) References Cited

U.S. PATENT DOCUMENTS

| | | | |
|---|---|---|---|
| 2012/0168199 A1* | 7/2012 | McCullough | H01B 7/14 174/113 R |
| 2012/0189256 A1 | 7/2012 | Allen et al. | |
| 2012/0241076 A1* | 9/2012 | Pingleton | A61M 25/0012 156/64 |
| 2013/0004122 A1 | 1/2013 | Kingsbury | |
| 2013/0127471 A1* | 5/2013 | Sudow | G01V 1/201 324/347 |
| 2013/0319126 A1* | 12/2013 | Lambert | G01D 5/35316 73/760 |
| 2014/0036635 A1* | 2/2014 | Launay | G01H 9/004 367/171 |
| 2014/0056553 A1* | 2/2014 | Villiger | G02B 6/4407 385/12 |
| 2014/0107630 A1 | 4/2014 | Yeik et al. | |
| 2014/0253128 A1* | 9/2014 | Shanks | E21B 47/102 324/324 |
| 2014/0318220 A1* | 10/2014 | Sawada | G01L 19/0007 73/40 |
| 2015/0085618 A1* | 3/2015 | Furuhaug | G01V 1/188 367/172 |
| 2015/0153530 A1 | 6/2015 | Kordahi | |
| 2015/0234143 A1 | 8/2015 | Smith et al. | |
| 2015/0268433 A1* | 9/2015 | Stratton | G02B 6/4416 385/101 |

FOREIGN PATENT DOCUMENTS

| | | | | | |
|---|---|---|---|---|---|
| GB | 2051398 | A | * | 1/1981 | G02B 6/4427 |
| GB | 2156539 | A | * | 10/1985 | G02B 6/4438 |
| JP | 62039813 | A | * | 2/1987 | |
| JP | 08219935 | A | * | 8/1996 | |
| JP | 08234067 | A | * | 9/1996 | G02B 6/4427 |
| JP | 09007432 | A | * | 1/1997 | |
| JP | 11287935 | A | * | 10/1999 | |
| JP | 2000028878 | A | * | 1/2000 | |
| JP | 2007271513 | A | * | 10/2007 | |
| SE | 1350785 | A1 | * | 6/2013 | G01N 21/01 |

OTHER PUBLICATIONS

Machine Translation of JP 2000028878 A, Jan. 2000 (Year: 2000).*
Finishadapt, LLC, "FinishAdapt 154 Pinless Mini Range Fusion Splice Protector Sleeve", http://www.finishadaptcom/docs/154-range.pdf (accessed May 31, 2016), published at least as early as 2009 (according to "archive.org/.web/").

* cited by examiner

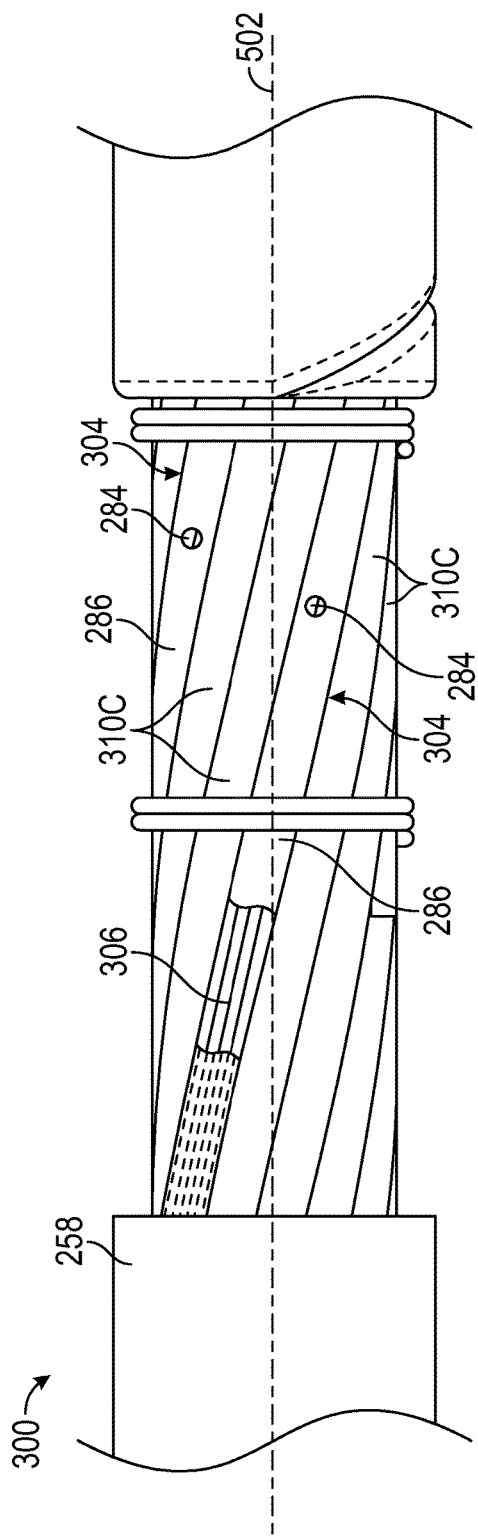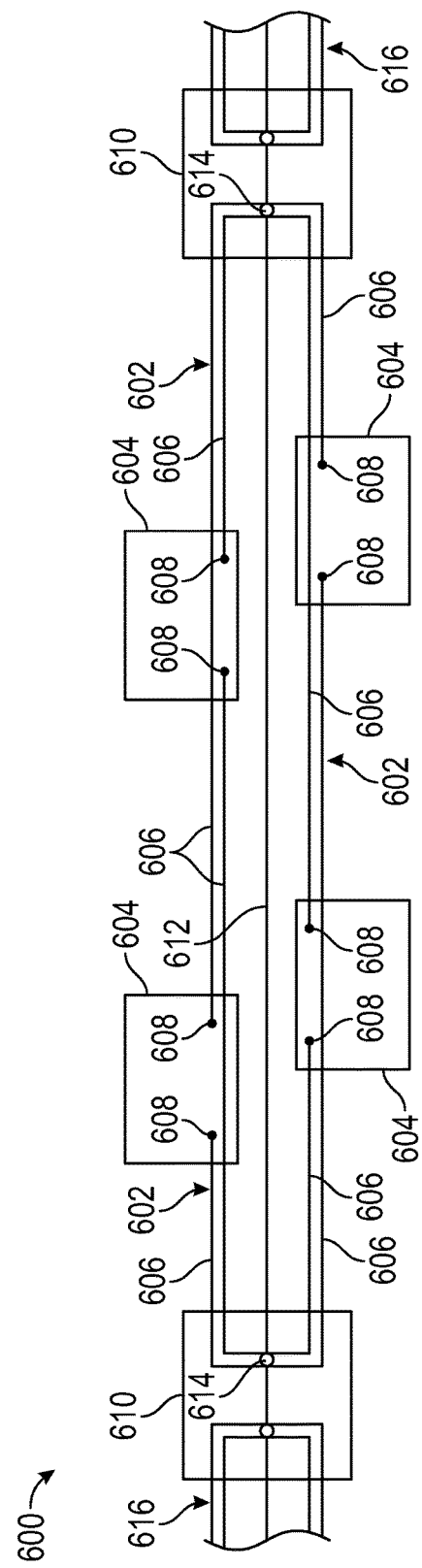

VENTED OPTICAL TUBE

CROSS-REFERENCE TO RELATED APPLICATIONS

This application claims the benefit of U.S. Provisional Application Ser. No. 62/202,198 filed Aug. 7, 2015 and titled "Vented Optical Tube. The provisional application is incorporated by reference herein as if reproduced in full below.

BACKGROUND

Geophysical surveying (e.g., seismic, electromagnetic) is a technique where two-or three-dimensional "pictures" of the state of an underground formation are taken. Geophysical surveying takes place not only on land, but also in marine environments (e.g., ocean, large lakes). Marine geophysical survey systems may use a plurality of sensor cables, which contain one or more sensors to detect acoustic energy emitted by one or more sources and returned from a hydrocarbon reservoir and/or associated subsurface formations beneath the sea floor. Sensor cables, in some embodiments may comprise sensor streamers which may be towed through a water body by a survey vessel, and in other embodiments ocean bottom cables disposed on the sea floor or entrenched within the seabed.

In embodiments deployed on the sea floor or entrenched in the seabed, which may be referred to as permanent reservoir monitoring (PRM) systems, there can be water exposure for relatively long periods of time (e.g., months or years). For example, PRM systems may be designed for decades of operation in ultra-deep water (e.g., greater than 1500 m), while also remaining suitable for use at shallower depths. In such subsea applications based on optically-powered sensors and optical telemetry, conventional wisdom dictates the use of gel-filled stainless steel conduits for the optical fibers with robust hermetic seals at every connection and each of the sensor splices, which typically number in the hundreds and possibly the thousands. Each seal represents a cost and a potential failure location. Thus, mechanisms to reduce the need for such seals would be advantageous.

BRIEF DESCRIPTION OF THE DRAWINGS

For a detailed description of exemplary embodiments, reference will now be made to the accompanying drawings in which:

FIG. 5 shows a sensor cable in accordance with at least some embodiments;

FIG. 6 shows a sensor cable portion in accordance with at least some embodiments.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"About" shall mean, when used in conjunction with a non-integer numerical value, ±10%.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims is limited to that embodiment.

Figure 1:
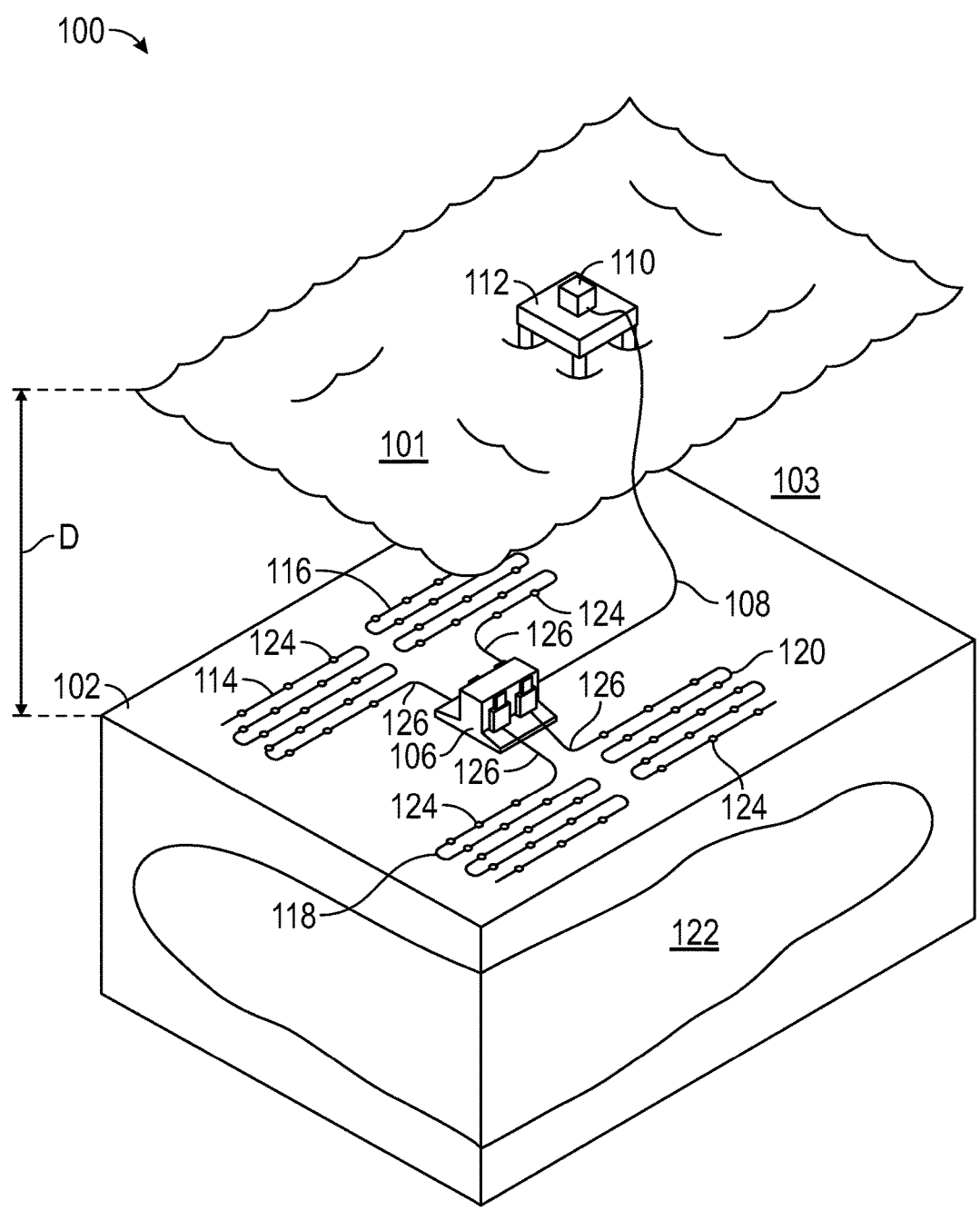
FIG. 1 shows a partial cutaway perspective view of a marine geophysical survey environment in accordance with at least some embodiments.

FIG. 1 shows a perspective cut-away view of a portion of a marine geophysical survey environment 100. Marine geophysical survey environment 100 may be used in conjunction with the exemplary cable embodiments described hereinbelow. FIG. 1 shows the surface 101 of the water. At a distance D below the surface 101 resides the sea bed 102, and below the sea bed 102 resides a hydrocarbon reservoir 122.

Within the environment of FIG. 1 a base unit 106 may be installed on sea bed 102 which mechanically and communicatively couples to an umbilical cable 108 that extends from the base unit 106 to a computer system 110 at the surface. Umbilical cable 108 may comprise an optical fiber link to computer system 110, or an optical fiber link and/or an electronic communication link. In the example system of FIG. 1, the computer system 110 may reside on a vessel 112 floating on the surface 101 of water body 103. The vessel 112 is illustratively shown as a floating platform, but other surface vessels may be used (e.g., ships, barges, or platforms anchored or mounted to the sea floor). By way of the umbilical cable 108, the base unit 106, as well as the various sensor cables 114, 116, 118 and 120 are communicatively coupled to the computer system 110.

Each of sensor cables 114, 116, 118 and 120 comprise a plurality of seismic sensors 124. For ease of illustration only fifteen seismic sensors 124 are shown associated with sensor cables 114, for example. However, in practice many hundreds or thousands of such devices may be spaced along the sensor cable 114. By way of example, sensors 124 may be spaced along a sensor cable 114 at intervals of about 50 meters. Further, in at least some embodiments, the spacing of sensors 124 may be in the range from 25 meters to 250 meters. However, the seismic sensors 124 need not be evenly spaced along the sensor cables, and extended portions of the sensor cables may be without seismic devices. For example, lead-in portions 126 may have expanses within which no seismic sensors are located. Each seismic sensor 124 may comprise a particle motion sensor and an acoustic pressure sensor, or hydrophone, or both. Further, in at least some embodiments, a particle motion sensor may detect particle motions of the seabed along multiple directions, or axes. For example, at least some particle motion sensors may comprise so-called three-component, or three-axis particle motion sensors which detect particle motions of the seabed along three, typically mutually-orthogonal, directions or axes. In at least some embodiments, seismic sensors 124 may be optically-based devices in which optical power supplied to the sensor via a corresponding one of sensor cables 114, 116, 118 and 120 is modulated by the sensor in response to a seismic acoustic wavefield, e.g. particle motion of the sea bed 102 or acoustic pressure as the case may be, and returned to the vessel 112 via a sensor cable 114, 116, 118 and 120 and umbilical cable 108.

Figure 2:
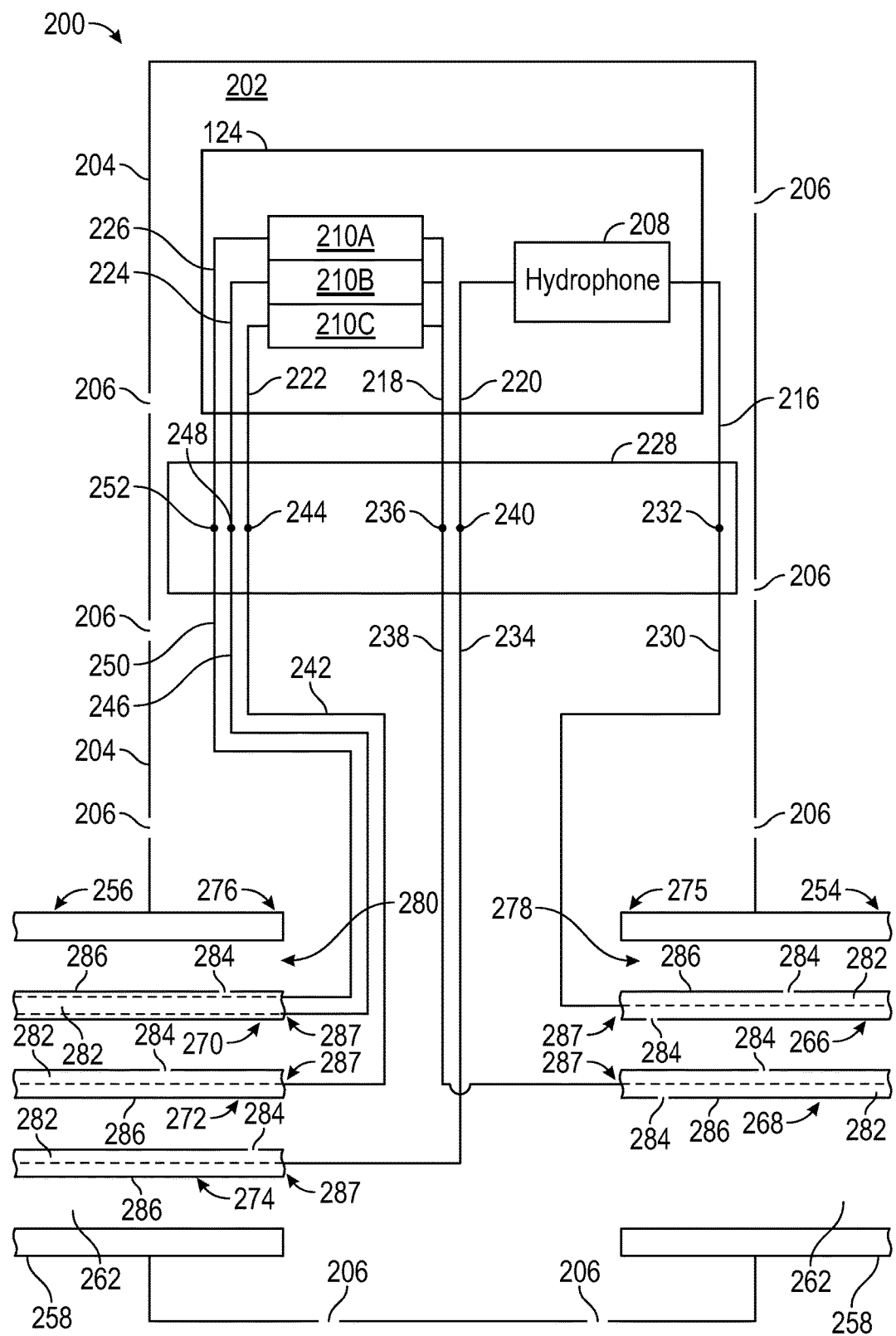
FIG. 2 shows a sensor module in accordance with at least some embodiments.

The coupling of seismic sensors to a sensor cable may be further understood by referring now to FIG. 2 showing a sensor module 200 in accordance with at least some embodiments. Sensor module 200 includes seismic sensor 124 disposed within interior volume 202 of an outer shell 204. As described further below, outer shell 204 may, when deployed within water body 103, admit sea water into interior volume 202 through, for example, ports 206 in outer shell 204. In other words, the outer shell may not be watertight and when sensor module 200 is submerged in a water body 103, such as an ocean, sea water may flood interior volume 202 by entering through ports 206 in outer shell 204. Although eight ports 206 are shown for purposes of illustration, any suitable number of ports may be 206 in various embodiments of sensor module 200. In the exemplary embodiment in FIG. 2, seismic sensor 124 includes a hydrophone 208, and particle motion sensors 210A, B and C each of which may be sensitive to particle motions of the seabed in one of three substantially mutually-orthogonal directions. Stated otherwise, particle motion sensors 210A-C together form a 3-axis particle motion sensor. Any suitable technology sensitive to particle motion may be used in conjunction with particle motion sensors 210A-C, such as geophones or accelerometers, for example.

As previously described, seismic sensors 124 may be optically-based devices. Thus, in at least some embodiments, optical power may be supplied to a seismic sensor 124 via optical fibers such as optical fiber 216 coupled to hydrophone 208 and optical fiber 218 coupled to particle motion sensors 210A-C. Optical power conveyed on optical fiber 218 may be split before being input to particle motion sensors 210A-C, however, for ease of illustration optical devices which may be used therefor are not shown in FIG. 2. Optical signals bearing seismic data output by hydrophone 208 and particle motion sensors 210A-C are conveyed on corresponding ones of optical fibers 220, 222, 224 and 226.

Optical fibers 216-226 may be coupled to sensor cables to receive optical power from a base unit 106 or vessel 112, say, and return optical signals from seismic sensor 124 thereto. By way of example, optical fibers 216-226 may be spliced to optical fibers within a sensor cable at a splice pad 228. Thus, in the exemplary embodiment of a sensor module 200 in FIG. 2, optical fiber 216 is spliced to optical fiber 230 at splice 232. Similarly, optical fiber 218 is spliced to optical fiber 234 at splice 236, optical fiber 220 is spliced to optical fiber 238 at splice 240, optical fiber 222 is spliced to optical fiber 242 at splice 244, optical fiber 224 is spliced to optical fiber 246 at splice 248, and optical fiber 226 is spliced to optical fiber 250 at splice 252.

Optical fibers 230, 234, 238, 242, 246, and 250 may be contained within respective segments of a sensor cable. Thus, for example, optical fibers 230 and 234 may be contained within sensor cable segment 254. Similarly, optical fibers 238, 242, 246 and 250 may be contained within sensor cable segment 256. Further, each sensor cable segment may comprise an outer jacket, for example outer jacket 258 of sensor cable segments 254 and 256. Optical fibers within a sensor cable segment may be disposed within a conduit that itself is disposed within an interior volume of the sensor cable segments. The interior volume is defined by the outer jacket of the sensor cable segment. Thus, outer jacket 258 of sensor cable segment 254 and 256 define an interior volume 262 of each sensor cable segment. In the example sensor cable segment 254, conduit 266 disposed within interior volume 262 carries optical fiber 230 and conduit 268 carries optical fiber 234. Similarly conduits 272 and 274 disposed within interior volume 262 of sensor cable segment 256 carry optical fibers 242 and 238, respectively. Each conduit 266, 268, 272 and 274 comprises a tube 286 having a wall which defines the interior volume 282 thereof and concomitantly an interior volume of the conduit. To access the optical fibers within the conduits, the tubes 286 are broken as shown. Although conduits 266, 268, 272 and 274 are shown as carrying a single fiber for ease of illustration, such conduits may carry a plurality of optical fibers. For example, conduit 270 disposed within interior volume 262 of sensor cable segment 256 is shown carrying optical fibers 246 and 250, however, such conduits may typically include about four fibers, as described further below in conjunction with FIG. 3. Moreover, the principles of the disclosure do not implicate a particular number of optical fibers. Further, sensor cable segments 254, 256 may include other structures also described further below.

Ends 275 and 276 of sensor cable segments 254 and 256 may extend through outer shell 204 and into interior volume 202 of outer shell 204. Further, openings 278 and 280 in ends 275 and 276 respectively may expose the interior volumes 262 to the fluid, e.g., sea water, contained within interior volume 202 when sensor module 200 is deployed and allow the fluid to flood the interior volumes 262.

Fluid admitted into the interior volumes of the sensor cable segments may flow into and flood interior volumes 282 of conduits 266, 268, 270, 272 and 274 via perforations, or vents, 284 in the tubes 286, and via broken ends 287. For example, fluid within interior volume 262 may be in contact with an outer surface of the wall of a tube 286 and the vents 284 convey fluid into the interior volumes 284. In this way, a pressure balanced configuration may be provided in which no pressure differential exists across tubes 286.

Figure 3:
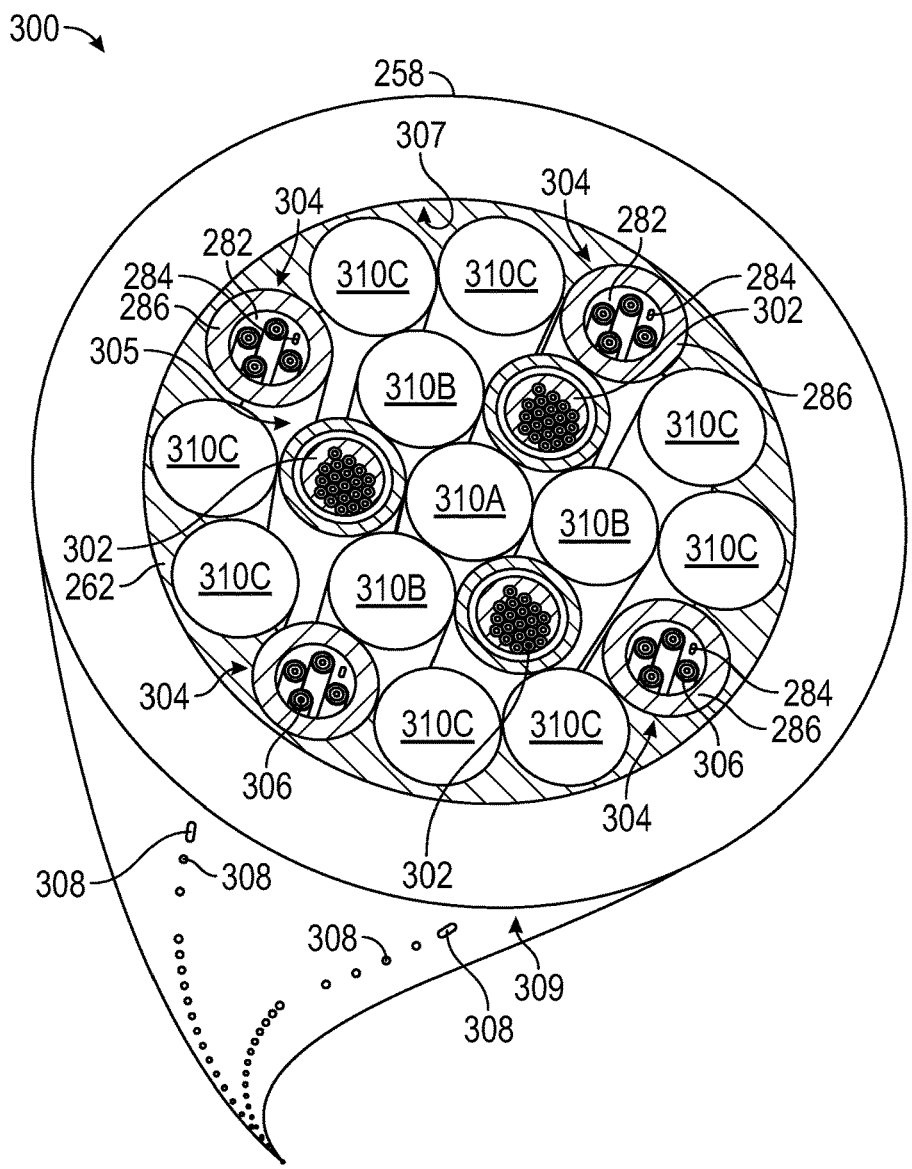
FIG. 3 shows a sensor cable in accordance with at least some embodiments.

The foregoing may be further appreciated by referring to FIG. 3 illustrating a sensor cable 300 in accordance with at least some embodiments. Sensor cable 300 may be exemplary of embodiments of sensor cable used in subsea environments and exemplary of sensor cable segments 254, 256. Sensor cable 300 also includes, disposed within interior volume 262 strength members 310. Strength members 310 may comprise, for example, galvanized steel wire, however any suitable wire or strand materials that provide adequate design strengths may be used. In this exemplary embodiment, disposed about a central strength member 310A are three strength members 310B intertwined with three sealed optical fiber conduits 302. Disposed about the intertwined strength members 310B and sealed optical fiber conduits 302 are four floodable optical fiber conduits 304, and strength members 310C. Floodable optical fiber conduits 304 include four optical fibers 306 disposed within an interior volume 282 and tube 286 having an wall defining interior volume 282. Tubes 286 may also be referred to as "loose tubes." Tubes 286 may have, in at least some embodiments, an inner diameter of about 2 millimeters and an outer diameter of about 3 millimeters. Although four optical fibers are shown by way of example, other numbers of optical fibers may be enclosed in a tube 286.

Tubes 286 comprise a wall including vents 284 passing between an outer surface 305 and interior volume 282. Vents 284 allow for the ingress of a fluid into interior volume 282 as described above. Tubes 286 may comprise a plastic material, e.g. polypropylene or polyvinylidene fluoride (PVDF), or a metal such as stainless steel or other non-corrosive metal, e.g. brass. Exemplary materials suitable for tubes 286 are described in the commonly-owned, co-pending U.S. Patent Publication No. 2015/0234143 titled "Subsea Cable Having Floodable Optical Conduit" which is hereby incorporated by reference as if fully reproduced herein. Further, in at least some embodiments, tubes 286 may comprise a porous material in which vents 284 comprise the pores disposed therein. In still other illustrative embodiments, tubes 286 may comprise a mesh-like structure in which the vents comprise openings in the structure. Floodable optical fiber conduits 304 may be exemplary of conduits 266, 268, 270, 272 and 274. Outer jacket 258 comprises inner surface 307 and an outer surface 309, and defines an interior volume 262 bounded by inner surface 307. Further, perforations, or vents, 308 may also be provided in the outer jacket 258, which vents pass between the outer surface 309 and the inner surface 307 to the interior volume 262. Similar to tubes 286, outer jacket 258 may comprise a porous material in which vents 308 comprise the pores disposed therein. Further, in at least some embodiments, outer jacket 258 may comprise a mesh-like structure in which the vents comprise openings in the structure. The vents 308 provide for fluid communication between a water body and interior volume 262 and allow for the ingress of a fluid such as sea water into the interior volume 262. Thus, in addition to fluid entering interior volume 262 via ends of sensor cable segments as described above, in at least some embodiments a fluid such as sea water may be admitted through vents 308. Further, as a sensor cable 300 is deployed in the sea, say, sea water may either compress or displace any gas, such as air, entrained in interior volume 262 and expel it through other vents 308. Likewise, the sea water may flow through vents 284 in tubes 286 into interior volume 282 thereof thereby flooding floodable optical fiber conduits 304 and compressing or displacing any entrained gas, e.g. air, which may be also be expelled through other vents 284. Thus, a pressure-balanced configuration for the sensor cable segment may be realized.

Figure 4:
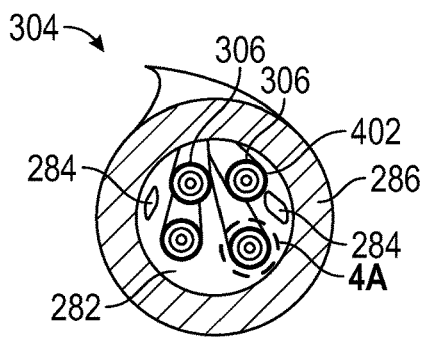
FIGS. 4 and 4A show a floodable optical fiber conduit in accordance with at least some embodiments.
Figure 4A:
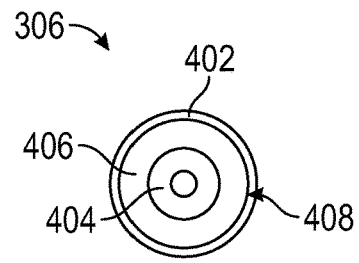

Turning to FIG. 4, there is shown a floodable optical fiber conduit 304 in further detail. As described above, exemplary floodable optical fiber conduit 304 includes four optical fibers 306. Each of the optical fibers may include a buffer layer 402 which may be disposed upon and adhere to an outer surface of the primary polymer coating of optical fibers 306. This may be seen in FIG. 4A showing an optical fiber 306 in further detail, in which optical fiber 306 comprises a core 404 and primary polymer coating 406. The buffer layer 402 may adhere in a fashion that resists separation from the outer surface 408 of the primary polymer coating 406. Exemplary materials suitable for buffer layer 402 are also described in the aforementioned U.S. Patent Publication No. 2015/0234143.

FIG. 5 shows a cutaway front view of a sensor cable 300 further illustrating the intertwined relationship of the components therein. In FIG. 5, outer jacket 258 is shown cutaway to expose structures within sensor cable 300 including strength members 310C and conduits 304. Further, in FIG. 5 it is seen that in at least some embodiments of a sensor cable in accordance with a sensor cable 300, the strength members and conduits are helically wound within the interior volume (not visible in FIG. 5) of the sensor cable. Further, the strength members and conduits may be helicoidally disposed about a central axis 502 of sensor cable 300. A portion of a tube 286 of one of the conduits 304 has been shown cut away to expose optical fibers 306 within. In at least some embodiments, a tube 286 may comprise a helicoid matching the helical pitch of the other cable members, e.g. conduits 304, strength members 310C, in sensor cable 300.

As previously described, each of tubes 286 comprises a wall perforated by a vent 284, each vent 284 configured to convey a fluid into an interior volume 282 defined by the wall. Further each tube 286 may include a plurality of vents 284 spaced at intervals along a length of the tube. Each vent 284 may have a preselected size based on a desired rate of ingress of fluid into the interior volume 282 (not shown in FIG. 5) of the tube, and both the size of the vents 284 and the spacing of the vents along a particular length of tube, in other words the population of vents, may be preselected to obtain a desired, or preselected, flow rate based, for example, on a given rate of deployment of a sensor cable 300. Stated otherwise, considering an ocean deployment, as a sensor cable embodiment in accordance with sensor cable 300, e.g. a sensor cable 114, 116, 118, or 120 is deployed into the ocean and begins to sink toward the sea floor, sea water can flood the cable and the interior volume of the conduit tubes; the rate of flooding depends on the size and number of vents and the openings in the ends of sensor cable segments described above and the ambient water pressure at the depth of the sensor cable based on the principles of hydrodynamics governing the flow of sea water. The size and population of vents may thus be designed such that the sensor cable and conduits are maintained in an approximately pressure-balanced state as the sensor cable sinks. For example, at a sensor cable deployment rate of 0.56 meters/sec, and for an exemplary tube inside diameter of about 2.0 millimeters (mm), the vents may be sized to give a volumetric flow rate to flood the conduits of about 2300 cubic mm/sec. Other exemplary flow rates may be greater than or equal to about 1000 cubic mm/sec, and still other illustrative flow rates may be in a range of between about 1000 and 3000 cubic mm/sec. In at least some embodiments, the size of the vents may be such that the cross-sectional area of the vents is equivalent to a circle having a diameter of 2.0 millimeters, or about 3.14 square millimeters. In at least some other illustrative embodiments, a vent diameter may be greater than or equal to about 1 millimeter, and in yet other illustrative embodiments, the vent diameter may be equal to or greater than about 20 micrometers, which vent diameters may be exemplary of tubes 286 comprising a porous material as described above. In still other illustrative embodiments, the vents may have a size such that the cross-sectional area is equivalent to the area of a circle having a diameter equal to or greater than about 1 millimeter, and in still other illustrative embodiments the vents may have a size such that the cross-sectional area is equivalent to the area of a circle having a diameter of equal to or greater than about 20 micrometers. And, in yet other illustrative embodiments, the vents may have a size such that the cross-sectional area is equivalent to the area of a circle having a diameter in the range of about 1 millimeter to about 10 millimeters. Further, the distance between the vents along a length of a tube may be in the range of about 25 meters to about 250 meters.

As described above, a sensor cable may include, both floodable optical fiber conduits and sealed optical fiber conduits. In at least some embodiments, the sealed optical fiber conduits may be used for long haul communications along the sensor cable and the floodable optical fiber conduits used to connect to the sensor modules as described above. Optical fibers within the floodable optical fiber conduits may then connect to fibers within the sealed optical fiber conduits as will now be described in conjunction with FIG. 6. FIG. 6 shows a portion 600 of a sensor cable including three sensor cable segments 602 coupled to sensor modules 604. Sensor modules 604 may comprise exemplary sensor modules 200 described above. Optical fibers 606 contained in floodable optical fiber conduit are coupled to sensor modules 604 (the coupling represented by dots 608) as described above. At telemetry modules 610, optical fibers 606 couple to optical fibers 612 contained in a sealed optical fiber conduit, the coupling represented by dots 614. Telemetry modules 610 also provide coupling of optical fibers 612 in sealed optical fiber conduits in sensor cable segments 602 to neighboring segments 616. While four sensor modules 604 are shown between telemetry modules 610, in practice many more sensor modules may be connected to a sensor cable between telemetry modules. In at least some exemplary embodiments, telemetry modules may be separated by a distance in the range of a few kilometers, and sensor modules may be spaced, for example, at intervals of about 50 meters. In other exemplary embodiments, the sensor modules may be spaced in the range from 25 meters to 250 meters.

Figure 7:
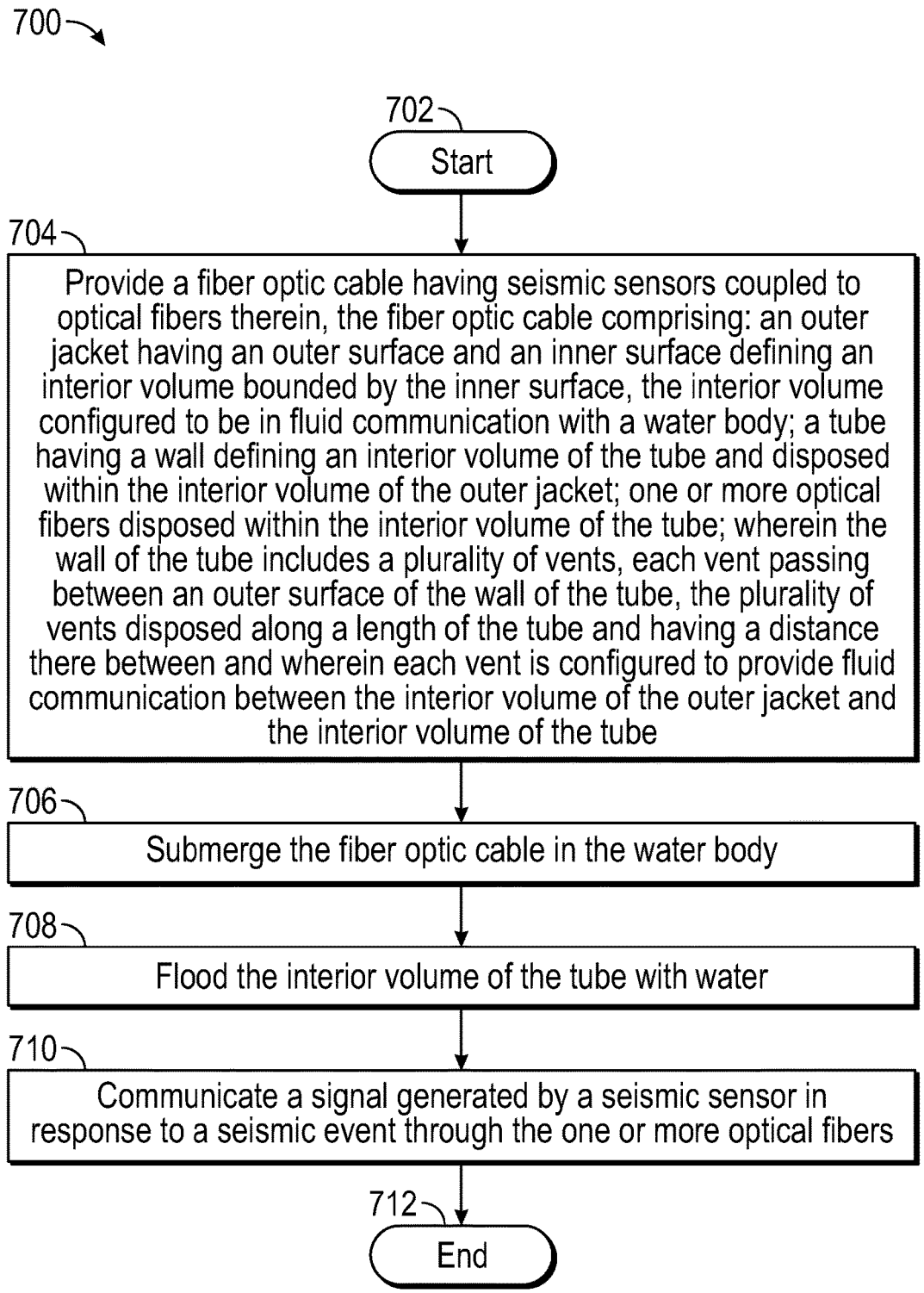
FIG. 7 shows a flowchart of a method in accordance with at least some embodiments.

Refer now to FIG. 7 showing a flowchart of a method 700 in accordance with at least some embodiments. Method 700 starts at block 702. In block 704, a fiber optic cable having seismic sensors connected to one or more optical fibers therein is provided. The fiber optic cable may comprise an outer jacket having an outer surface and an inner surface and defining an interior volume bounded by the inner surface, in which the interior volume is configured to be in fluid communication with a water body. A tube having a wall defining an interior volume of the tube may be disposed within the interior volume of the outer jacket, and one or more optical fibers disposed within the interior volume of the tube. The wall of the tube may include a plurality of vents, each vent passing between an outer surface of the wall of the tube and the interior volume of the tube, the plurality of vents being disposed along a length of the tube and having a distance therebetween. Each vent may be configured to provide fluid communication between the interior volume of the outer jacket and the interior volume of the tube. The fiber optic cable is submerged in the water body, block 706. In block 708 the interior volume of the tube is flooded with water. A signal generated by a seismic sensor in response to a seismic event is communicated through the one or more optical fibers, block 710. Method 700 ends at block 712.

References to "one embodiment", "an embodiment", "a particular embodiment", and "some embodiments" indicate that a particular element or characteristic is included in at least one embodiment of the invention. Although the phrases in "one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, each sensor cable may include various numbers of strength member, floodable optical fiber conduits and sealed optical fiber conduits. And each floodable optical fiber conduit may include various numbers of optical fibers. It is intended that the following claims be interpreted to embrace all such variations and modifications.

What is claimed is:

1. An apparatus comprising:
   a conduit including:
      a tube having a water defining an interior volume of the tube;
      one or more optical fibers disposed within the interior volume of the tube, wherein:
         the wall of the tube includes a plurality of vents, each vent passing between an outer surface of the wall of the tube and the interior volume, the plurality of vents disposed along a length of the tube and having a distance therebetween;
         wherein the vents are configured to establish fluid communication between the interior volume of the outer jacket and the interior volume of the tube;
         wherein the vents have a population and size configured to provide a flow rate into the interior volume of the tube equal to or greater than 1000 cubic millimeters/sec; and
         wherein the distance between adjacent vents along the length of the tube is in a range of 25 meters to 250 meters.

2. The apparatus of claim 1 wherein the vents have a diameter equal to or greater than about 20 micrometers.

3. The apparatus of claim 2 wherein the diameter of the vents is greater than or equal to about 1 millimeter.

4. The apparatus of claim 1 wherein the tube comprises a plastic selected from the group consisting of:
   polypropylene; and
   polyvinylidene fluoride (PVDF).

5. The apparatus of claim 1 wherein the tube comprises a metal.

6. The apparatus of claim 5 wherein the metal comprises stainless steel.

7. The apparatus of claim 1 wherein the one or more optical fibers comprise a buffer layer disposed on an outer surface of a primary polymer coating of the optical fiber.

8. The apparatus of claim 1 wherein the conduit is a sensor cable defining a central axis: and
   wherein the tube is helicoidally disposed about the central axis of the sensor cable.

9. The apparatus of claim 1 wherein the tube includes an end defining an opening to convey fluid into the interior volume of the tube surrounding the one or more optical fibers.

10. The apparatus of claim 9 further including a sensor module having an outer shell defining an interior volume; and
   wherein the end of the tube is disposed within the interior volume of the sensor module providing fluid communication between the interior volume of the tube and the interior volume of the sensor module.

11. The apparatus a claim 10 wherein the outer shell defines a plurality of ports providing fluid communication between the interior body of the sensor module and a body of water with the sensor module submerged in the body of water.

12. A cable comprising:
an outer jacket having an outer surface and an inner surface and defining an interior volume bounded by the inner surface, the interior volume configured to be in fluid communication with a water body;
a tube having a wall defining an interior volume of the tube and disposed within the interior volume of the outer jacket; and
one or more optical fibers disposed within the interior volume of the tube, wherein:
the wall of the tube includes a plurality of vents, each vent passing between an outer surface of the wall of the tube and the interior volume of the tube, the plurality of vents disposed along a length of the tube and having a distance therebetween;
wherein each vent is configured to provide fluid communication between the interior volume of the outer jacket and the interior volume of the tube;
wherein the vents have a population and size configured to provide a flow rate into the interior volume of the tube equal to or greater than 1000 cubic millimeters/sec; and
wherein the distance between adjacent vents along the length of the tube is in a range of 25 meters to 250 meters.

13. The cable of claim 12 wherein the vents have a cross-sectional area equivalent to an area of a circle having a diameter equal to or greater than about 20 micrometers.

14. The cable of claim 13 wherein the vents have a cross-sectional area equivalent to an area of a circle having a diameter greater than about 1 millimeter.

15. The cable of claim 12 further comprising:
at least one strength member defining a central axis of the cable and wherein the tube comprises a helicoid disposed about the strength member.

16. The cable of claim 12 wherein the optical fibers comprise a buffer layer disposed on an outer surface of a primary polymer coating of the optical fiber.

17. The cable of claim 12 wherein the outer jacket comprises a plurality of vents between the outer surface of the outer jacket and the interior volume of the outer jacket, the vents configured to provide fluid communication between the interior volume of the outer jacket and a water body in fluid communication with the outer surface of the outer jacket.

18. The cable of claim 12 wherein the outer jacket includes an end defining an opening to convey fluid into the interior volume of the outer jacket surrounding the tube.

19. A method comprising:
providing a fiber optic cable having seismic sensors connected to optical fibers, the fiber optic cable comprising:
an outer jacket having an outer surface and an inner surface and defining an interior volume bounded by the inner surface, the interior volume configured to be in fluid communication with a water body;
a tube having a wall defining an interior volume of the tube and disposed within the interior volume of the outer jacket;
one or more optical fibers disposed within the interior volume of the tube, wherein:
the wall of the tube includes a plurality of vents, each vent passing between an outer surface of the wall of the tube and the interior volume of the tube, the plurality of vents disposed along the length of the tube and having a distance therebetween;
wherein each vent is configured to provide fluid communication between the interior volume of the outer jacket and the interior volume of the tube;
wherein the vents have a population and size configured to provide a flow rate into the interior volume of the tube is equal to or greater than 1000 cubic millimeters/sec; and
wherein the distance between adjacent vents along the length of the tube is in a range of 25 meters to 250 meters;
submerging the fiber optic cable in the water body;
flooding an interior volume of the tube with water; and
communicating a signal generated by seismic sensors in response to a seismic event through one or more of the optical fibers.

* * * * *